US012072083B2

(12) United States Patent
Razor

(10) Patent No.: US 12,072,083 B2
(45) Date of Patent: Aug. 27, 2024

(54) WET FLOOR SAFETY LIGHT

(71) Applicant: Joshua Razor, Dublin, OH (US)

(72) Inventor: Joshua Razor, Dublin, OH (US)

( * ) Notice: Subject to any disclaimer, the term of this patent is extended or adjusted under 35 U.S.C. 154(b) by 0 days.

(21) Appl. No.: 18/050,328

(22) Filed: Oct. 27, 2022

(65) Prior Publication Data

US 2024/0142095 A1 May 2, 2024

(51) Int. Cl.
*F21V 21/22* (2006.01)
*F21S 8/08* (2006.01)

(52) U.S. Cl.
CPC ................ *F21V 21/22* (2013.01); *F21S 8/08* (2013.01)

(58) Field of Classification Search
CPC ........ F21S 6/005-006; G09F 13/00-02; G09F 13/16-165; G09F 2013/222-227; E01F 9/615-617; G08B 5/006; G08B 5/36; G08B 5/38
See application file for complete search history.

(56) References Cited

U.S. PATENT DOCUMENTS 6,003,257 A * 12/1999 Stokes ................ G09F 15/0062 404/6
7,941,952 B1 5/2011 Corbean
8,375,614 B2 2/2013 Stephenson
9,653,009 B2 * 5/2017 Rayhanian .......... G09F 15/0062
9,837,004 B2 12/2017 Rayhanian
2007/0222640 A1 9/2007 Guelzow, II et al.
2008/0209785 A1 9/2008 Jedlicka
2008/0271338 A1 * 11/2008 Muir ..................... F26B 21/001 34/201
2011/0058898 A1 * 3/2011 Beh ......................... E01F 9/654 404/6
2014/0104057 A1 * 4/2014 Futrell ................. B60Q 1/2611 2/102
2015/0015406 A1 1/2015 Furtado
2016/0247366 A1 8/2016 Munoz et al.
2017/0274819 A1 9/2017 Domingo
2021/0221281 A1 * 7/2021 Tohikian .............. B60Q 1/2615

FOREIGN PATENT DOCUMENTS

CN 102286947 A * 12/2011
KR 101660939 B1 * 9/2016

* cited by examiner

*Primary Examiner* — Mariceli Santiago
(74) *Attorney, Agent, or Firm* — Carlile Patchen & Murphy LLP; Eric Estadt

(57) ABSTRACT

A hazard warning device for warning of hazardous conditions on a surface, comprising a base, a stand, a sign, and a projector, the projector configured to illuminate a hazard on a surface underneath the projector. The projector comprises a light source and a lens to focus and shape the projected light into a circle on the surface, encompassing the hazard.

18 Claims, 19 Drawing Sheets

WET FLOOR SAFETY LIGHT

BACKGROUND

Field of Invention

The invention relates to hazard warning devices, and more specifically to illuminating safety devices that are placed on floors or other walking surfaces to warn people of potentially hazardous conditions on the floor or surface.

Description of the Related Art

Slip and fall injuries contribute to an unacceptable number of deaths and injuries every year, contributing to increased healthcare costs and lost productivity, and resulting in expensive litigation.

According to the Bureau of Labor Statistics, fall, slip and trip injuries accounted for 16.9% of all fatal occupational injuries in 2020, eclipsing deaths due to exposure to harmful substances or environments and injurious contact with objects and equipment. https://www.bls.gov/iif/oshwc/cfoi/cftb0340.htm. Moreover, 211,640 workers suffered fall, slip, or trip injuries severe enough to require them to take days off of work in 2020. https://www.bls.gov/iif/oshwc/osh/case/cd_r4_2020.htm. More than half of these injuries were a result of an employee falling on the same floor they were standing on.

Slip and fall injuries are entirely preventable. However, while hazard warning devices have existed for years, these prior solutions have been inadequate to sufficiently reduce the number of slip and fall injuries and deaths.

For example, "wet floor" signs have been used ubiquitously in governmental, commercial and industrial settings as an inexpensive means of warning employees and the public of possible slipping hazards. However, these signs can be easily overlooked, especially by members of the public who are unfamiliar with the layout of a building. Moreover, warning signs are often left on a floor long after the hazard has been removed or has dried up and may easily be ignored when the hazard itself is not easily visible.

While some solutions, such as U.S. Pat. No. 6,003,257 include lights to make the sign more noticeable, this solution still fails to illuminate and outline the hazardous area itself. People may still become injured when they do not see the full extent of the hazard, even if they take notice of the sign. Moreover, people may be discouraged from walking anywhere near the sign if they cannot determine the area of the surface that is actually hazardous.

U.S. Pat. No. 9,653,009 presents one possible solution to hazard illumination, wherein an ultraviolet light attached to the sign projects ultraviolet light onto an area of a floor. When a light refracting liquid or powder is added to a fluid on the floor, the ultraviolet light is refracted off of the fluid mixture. However, this solution requires the user to add a chemical to the hazard itself, and there is a risk that the chemical may not be compatible with the hazard or that it will fail to become sufficiently dispersed to illuminate the entire hazard.

Therefore, a need exists for a device that is portable, compact, and inexpensive enough to be easily deployed by in indoor spaces, that is both conspicuous enough to draw attention to the hazard as well as indicating the area of the surface that is actually hazardous.

SUMMARY OF THE INVENTION

It is therefore an object of the present invention to provide a hazard warning device comprising a base, a stand, a sign, and a projector, the projector configured to illuminate a hazard on a surface.

It is another object of the invention to provide a hazard warning device comprising a base, a stand, a sign, and a projector, the projector comprising at least one light source and at least one lens and configured to project light onto a hazard on a surface.

It is another object of the invention to provide a hazard warning device comprising a base, a stand, a sign, and a projector, the projector comprising at least one light source and at least one lens and configured to project light onto a hazard on a surface, and the stand being adjustable to increase or decrease the radius of projected light.

It is another object of the invention to provide a hazard warning device comprising a base, a stand, a sign, and a projector, the projector comprising at least one light source and at least one lens and configured to project light onto a hazard on a surface, and the projector being adjustable to change the focus of projected light.

It is another object of the invention to provide a hazard warning device comprising a base, a stand, a sign, and a projector, the legs being foldable to increase the portability of the device.

It is another object of the invention to provide a hazard warning device comprising a base, a stand, a sign, a projector, and a sensor, the sensor being electrically connected to the projector to control its activation depending on detection of a predetermined value by the sensor.

It is another object of the invention to provide a hazard warning device comprising a base, a stand, a sign, a projector, and a timer, the timer being electrically connected to the projector to control its activation depending on a predetermined duration of time.

It is another object of the invention to provide a plurality of hazard warning devices, each comprising a base, a stand, a sign, and a projector, the projectors configured to illuminate a hazard on a surface, wherein the plurality of hazard warning devices are arranged to completely illuminate a hazard.

DETAILED DESCRIPTION OF THE PRESENT INVENTION

Figure 1:
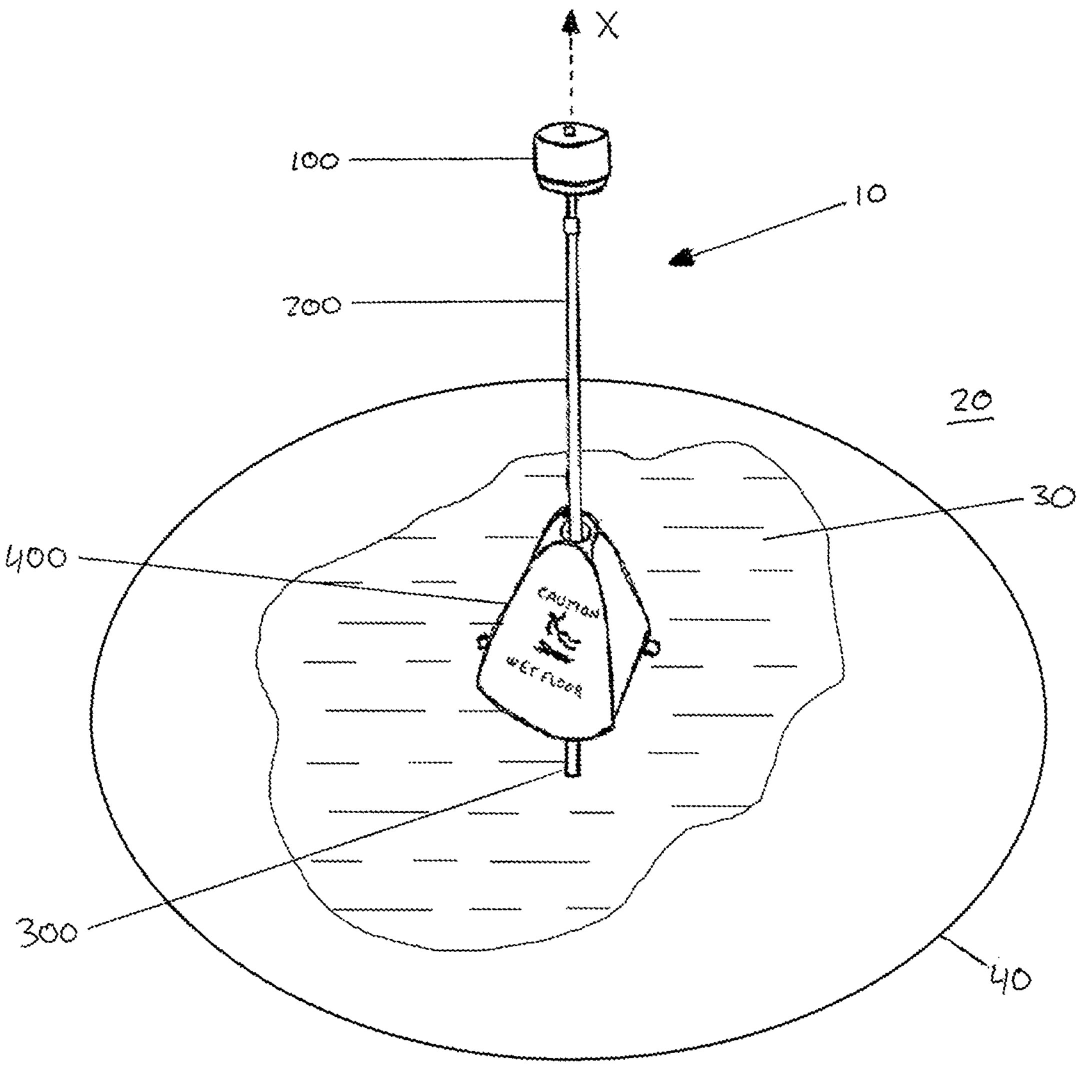
FIG. 1 is perspective view of a first embodiment of the warning device in accordance with a first embodiment of the invention.
Figure 2:
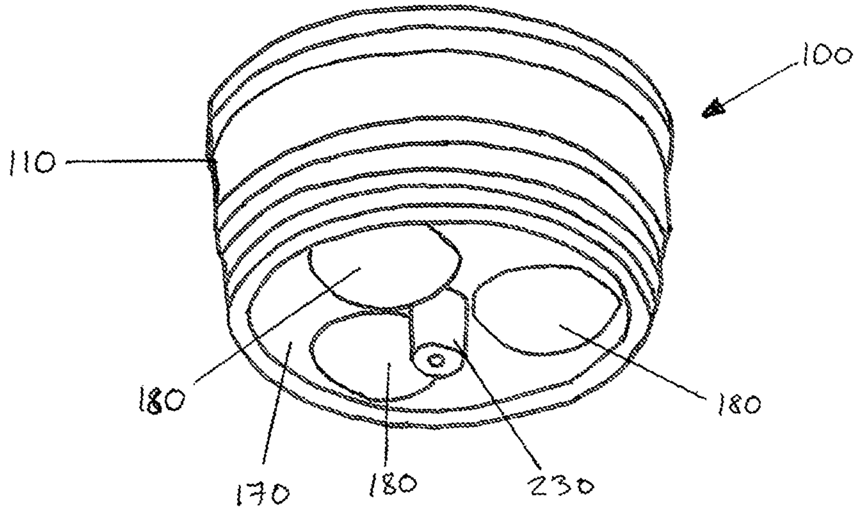
FIG. 2 a perspective view of a projector in accordance with a first embodiment of the invention.
Figure 3:
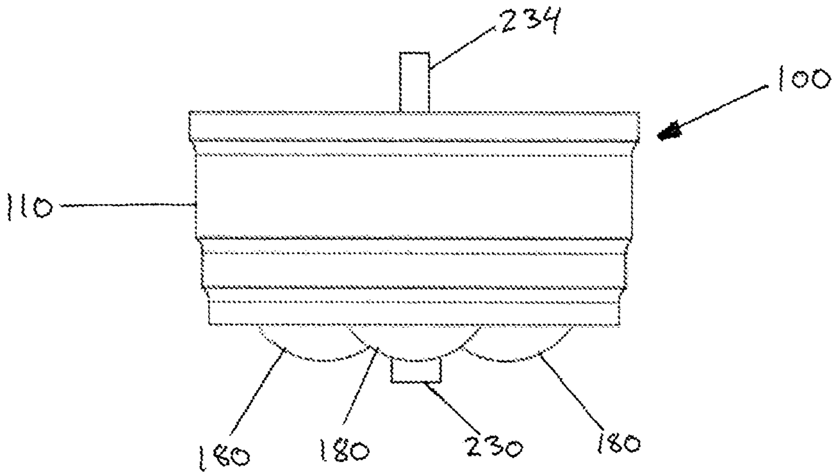
FIG. 3 is a side view of the projector of FIG. 2.
Figure 4:
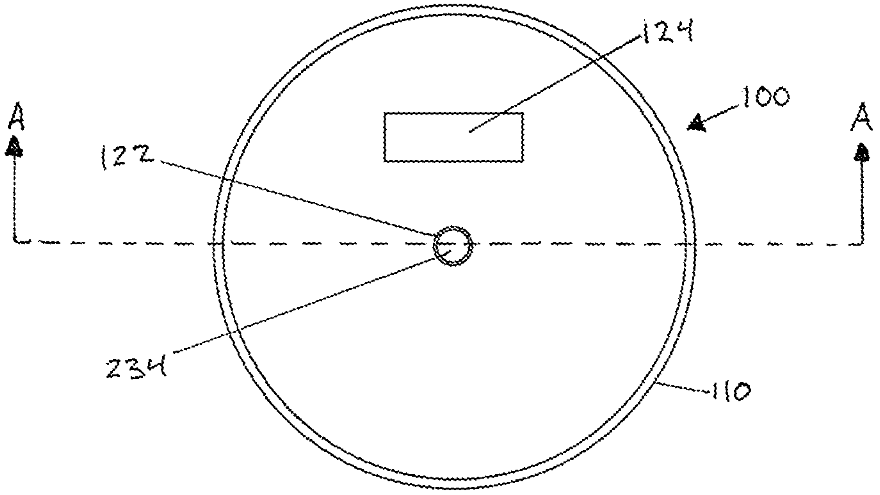
FIG. 4 is a top view of the projector of FIG. 2.

A warning device 10 according to the present invention comprises a projector 100, a stand 200, a base 300, and a sign 400. As used herein, the terms "top" and "up" refer to an orientation corresponding to the side of the device furthest from a floor or surface (i.e., in a direction towards the projector 100), while the terms "bottom" and "down" refer to an orientation corresponding to the side of the device closest to a floor or surface (i.e., in a direction towards the base 300). The terms "transverse" and "transversely" refer to a direction substantially orthogonal to a previously described direction. Furthermore, although certain elements are described or depicted as being located on a particular side or end of the device or in a particular orientation, it can be appreciated that some elements may be moved or rotated while maintaining their functional relationships. The term "adjacent" refers to elements that are positioned closely together and may include additional elements between unless expressly stated otherwise.

FIG. 1 shows a first embodiment of the hazard warning device 10 in use. The device 10 is placed on a surface 20 containing a hazard 30. The hazard 30 may be any kind of hazard that may risk injury to people, such as a wet floor, uneven floor, broken glass, or a chemical spill. The base 300 of device 10 may be placed on or next to the hazard 30. Once placed, a switch (not shown) is actuated on the projector 100, projecting a generally circular pattern of light 40 on the surface 20, illuminating hazard 30. A central axis X runs along the length of the device 10 from the top to the bottom and is coaxial with the projector 100, stand 200, and base 300.

FIGS. 2-5 show a projector 100 according to a first embodiment of the invention. The projector 100 comprises a housing 110, a cover plate 120, a power plate 130, an LED plate 150, and a lens plate 170. Each of the plates 120, 130, 150, and 170 are generally disc-shaped, having a top and bottom surface. The plates 120, 130, 150, and 170 are disposed within the housing 110 in a stacked configuration with the cover plate 120 being the top-most plate, the power plate 130 being disposed below the cover plate 120, the LED plate 150 being disposed below the power plate 130, and the lens plate 170 being disposed below the LED plate 150. A projector connector 230 includes a pin 234 and a shoulder 232, and is included to show the projector 100 in its assembled state.

Preferably, the housing 110 and plates 120, 130, 150, and 170 are made from plastic due to cost and ease of manufacture. However, these components may be made from any suitable material depending on the environment in which it is used. For example, if the device 10 is intended for outdoor use, one or more of the housing 110 and plates 120, 130, 150, and 170 may be provided with rubber or silicone seals to prevent moisture or precipitation from entering the projector 100, which could corrode or damage the electrical components inside. In addition, in environments where the device 10 may be easily knocked over or damaged, such as in high-wind conditions or areas with heavy machinery like construction sites and industrial facilities, the housing 110 and plates 120, 130, 150, and 170 may be made of a durable metal such as steel or aluminum.

Figure 6:
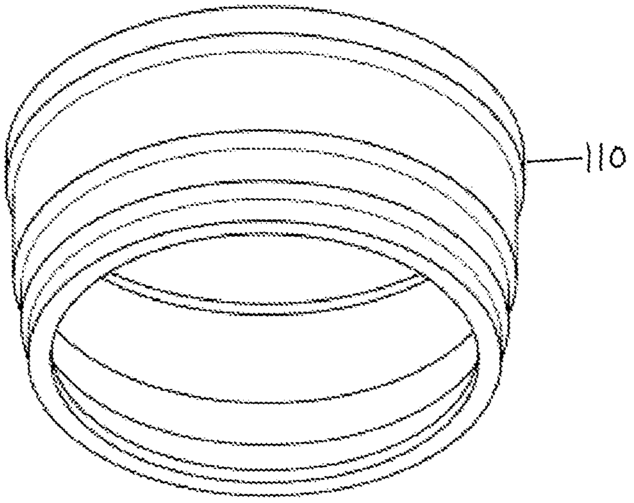
FIG. 6 is a perspective view of a housing in accordance with a first embodiment of the invention.
Figure 7:
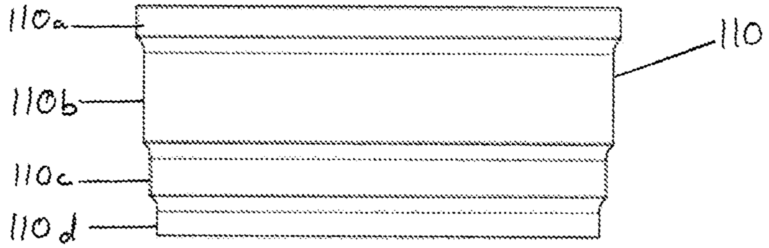
FIG. 7 is a side view of the housing of FIG. 6.
Figure 8:
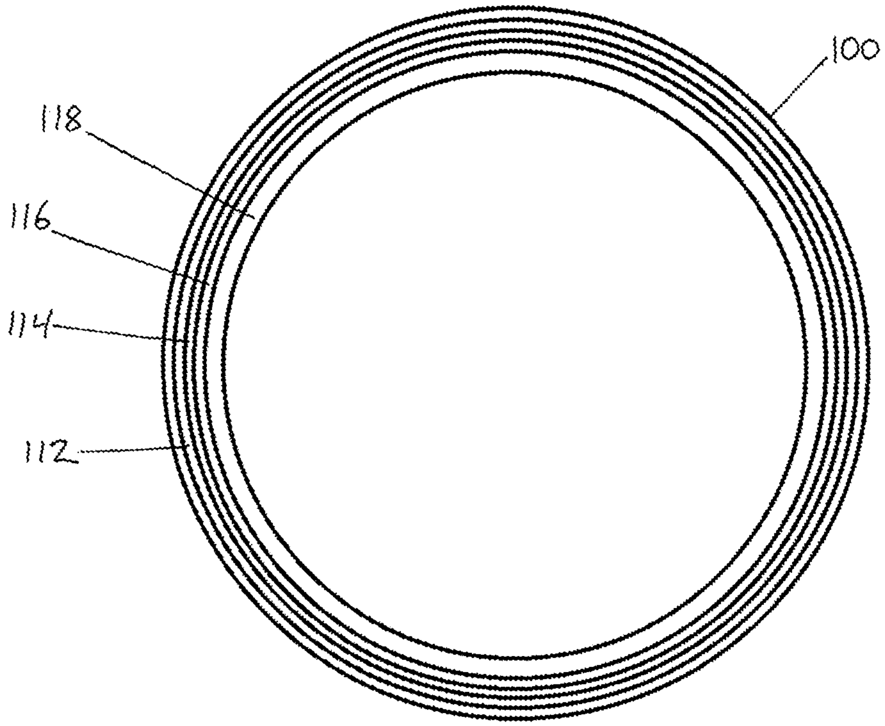
FIG. 8 is a top view of the housing of FIG. 6.
Figure 9:
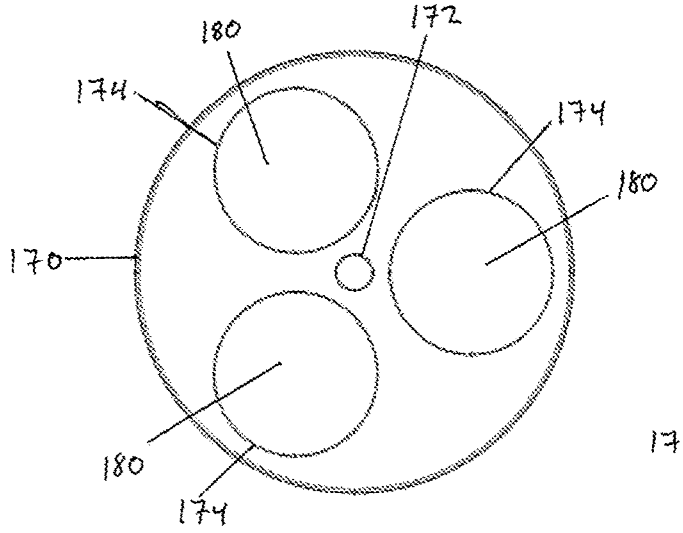
FIG. 9 is a top view of a lens plate in accordance with a first embodiment of the invention.
Figure 10:
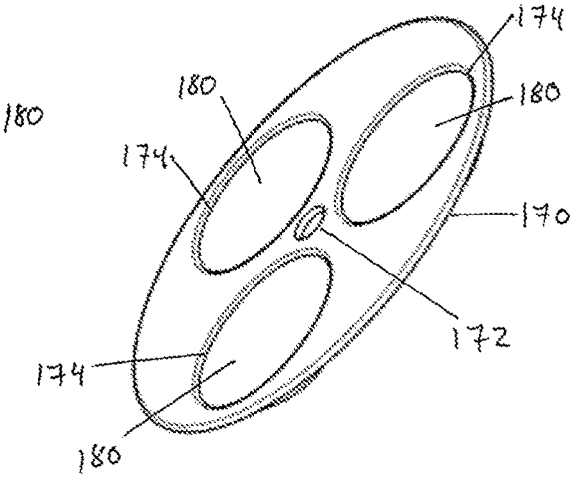
FIG. 10 is a perspective view of the lens plate of FIG. 9.
Figure 11:
FIG. 11 is a side view of the lens plate of FIG. 9.
Figure 12:
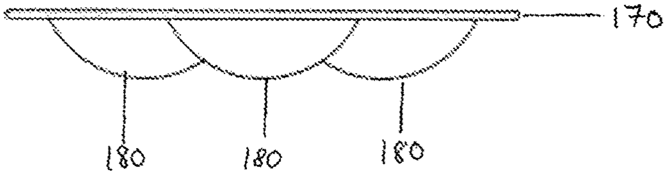
FIG. 12 is a front view of the lens plate of FIG. 9.
Figure 13:
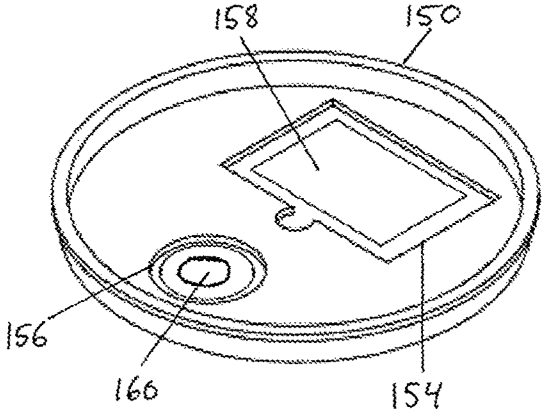
FIG. 13 is a perspective view of an LED plate in accordance with a first embodiment of the invention.
Figure 14:
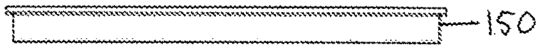
FIG. 14 is a side view of the LED plate of FIG. 13.
Figure 15:
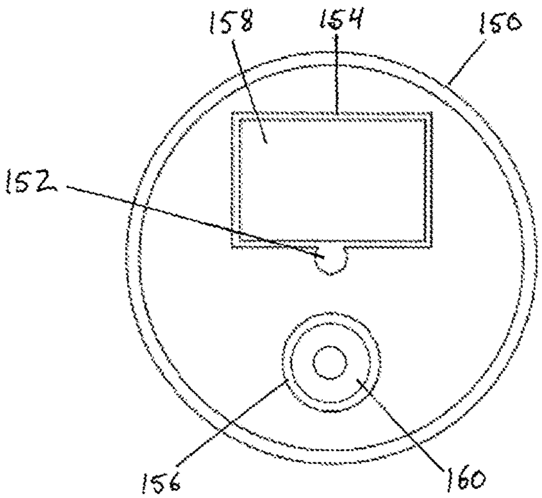
FIG. 15 is a top view of the LED plate of FIG. 13.
Figure 16:
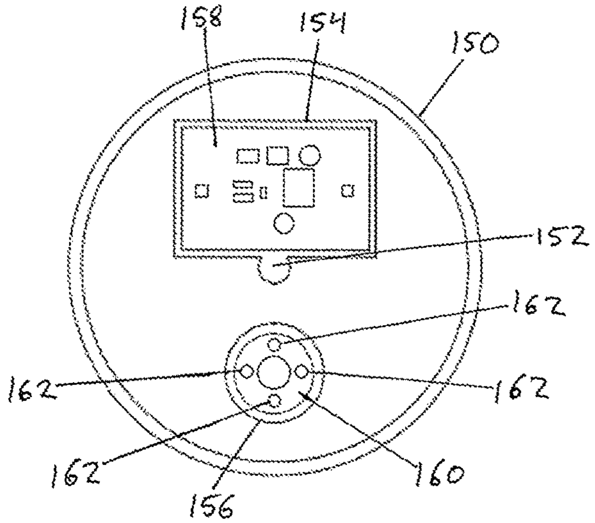
FIG. 16 is a bottom view of the LED plate of FIG. 13.
Figure 17:
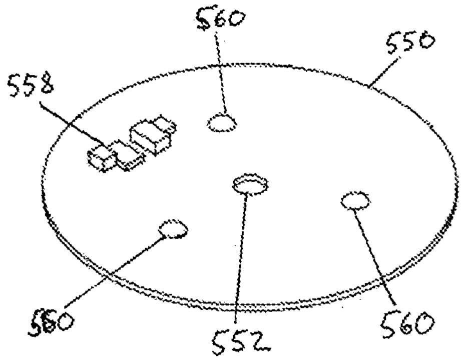
FIG. 17 is a perspective view of an LED plate in accordance with a second embodiment of the invention.
Figure 18:
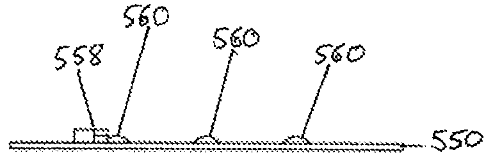
FIG. 18 is a side view of the LED plate of FIG. 17.
Figure 19:
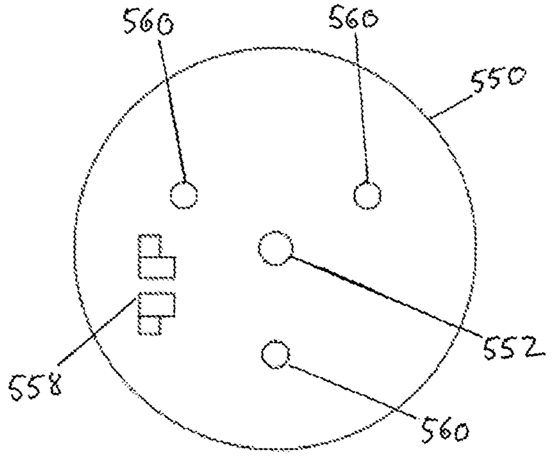
FIG. 19 is a bottom view of the LED plate of FIG. 17.
Figure 20:
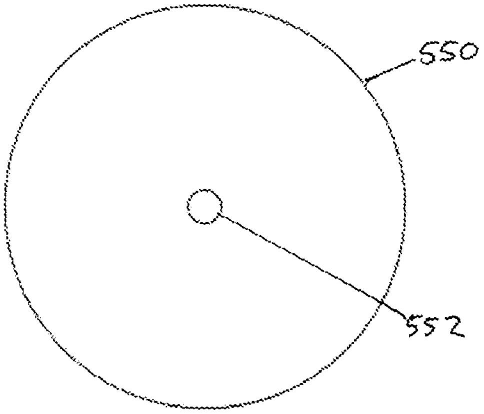
FIG. 20 is a top view of the LED plate of FIG. 17.
Figure 21:
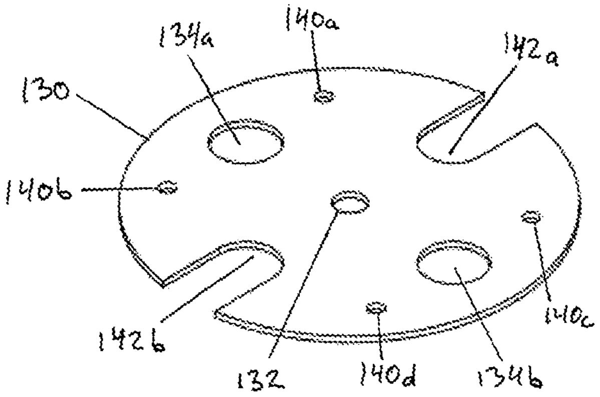
FIG. 21 is a perspective view of a power plate in accordance with a first embodiment of the invention, without showing a power source or switch.
Figure 22:
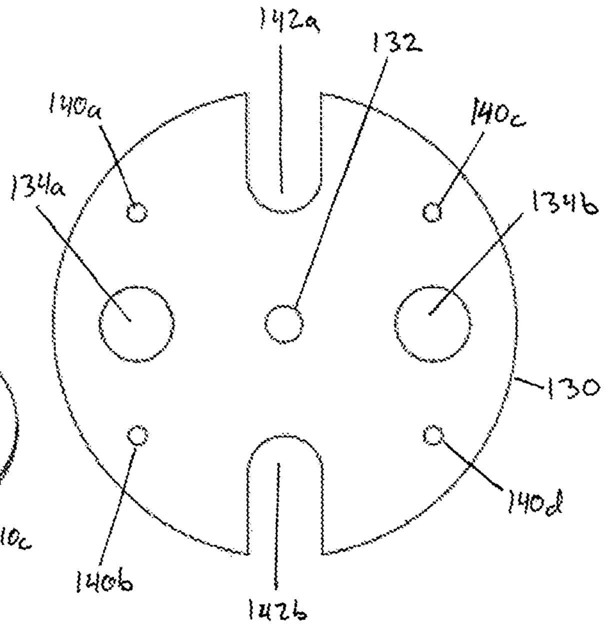
FIG. 22 is a top view of the power plate of FIG. 21.
Figure 23:
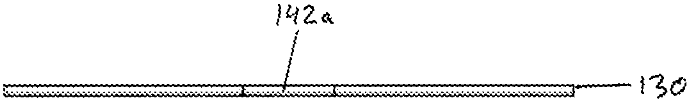
FIG. 23 is a side view of the power plate of FIG. 21.
Figure 24:
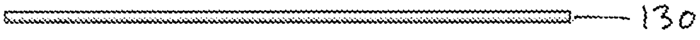
FIG. 24 is a front view of the power plate of FIG. 21.

FIGS. 6-8 show the housing 110 in accordance with a first embodiment of the invention. The housing 110 is generally cylindrical in shape and is coaxial to axis X. The interior of the housing 110 is generally hollow and is open at both ends. A first portion **110*a* has a first diameter and extends axially between the top edge of the housing 110 and a first ledge 112. A second portion 110*b* has a second diameter being less than the first diameter and extending axially between the first ledge 112 and a second ledge 114. A third portion 110*c* has a third diameter being less than the second diameter and extending axially between the second ledge 114 and a third ledge 116. A fourth portion 110*d* has a fourth diameter being less than the third diameter and extending axially between the third ledge 116 and a fourth ledge 118**.

FIGS. 9-12 show a lens plate 170 in accordance with a first embodiment of the invention. The lens plate 170 has a diameter less than the fourth diameter of the housing 110. The bottom surface of the lens plate 170 rests on the top surface of the fourth ledge 118. A center hole 172 is formed in the center of the lens plate 170 and has a diameter larger than the pin 234 of projector connector 230 but smaller than shoulder 232.

The lens plate 170 includes at least three lens holes 174 positioned between the center hole 172 and the outer edge of the lens plate 170 and spaced approximately equally with respect to axis X. For example, in embodiments comprising three lens holes 174 each lens hole is arranged approximately 120 degrees apart from adjacent lens holes, while in embodiments comprising four lens holes 174 each lens hole is arranged approximately 90 degrees apart from adjacent lens holes.

Each lens 180 is configured to rest within a lens hole 174. Preferably, each lens 180 is the same size and shape. However, in other embodiments, the lenses 180 may be different sizes and/or shapes to shape and focus the projected light differently. In the preferred embodiment, each lens 180 is generally hemispherical in shape, having a flat surface and a curved surface. Each lens hole 174 and lens 180 are dimensioned such that a small portion of the curved surface abuts the edges of the lens holes 174, while most of the curved surface of the lenses 180 extend through the lens holes 174 and project below the bottom surface of the lens plate 170. Lenses 180 are preferably made of glass. However, lenses 180 may also be made from suitable plastic and polymer materials, such as polycarbonate, for decreased costs or other desirable characteristics such as scratch or fog resistance.

FIGS. 13-16 show an LED plate 150 in accordance with a first embodiment of the invention. The LED plate 150 has a diameter less than the third diameter of the housing 110. The bottom surface of the LED plate 150 rests on the top surface of the third ledge 116. A center hole 152 is formed in the center of the LED plate 150 and has a diameter larger than the pin 234 of projector connector 230 but smaller than shoulder 232. The LED plate 150 comprises an LED circuit 158 and a single LED unit 160. LED circuit 158 comprises electrical components to control and deliver power to the LED unit 160. Electrical connections between the LED circuit 158 and LED unit 160 are not shown for clarity. LED circuit 158 is preferably disposed on a PCB board. LED unit 160 comprises a plurality of LEDs 162 in electrical communication with the LED circuit 158.

Preferably, the LEDs 162 shine light in a red color to increase visibility, to contrast with ambient light, and because red is often used to signal danger or caution. However, lights of other colors or in multiple colors may be used without departing from the scope of the invention. Furthermore, other types of lights, such as conventional incandescent bulbs may be used. However, LEDs are preferred due to their low cost, high efficiency, brightness, and life.

A circuit cutout 154 is formed in the LED plate 150 in generally the same size and shape as the LED circuit 158. LED circuit 158 is disposed within the circuit cutout 154 to secure it in place The circuit cutout 154 also serves to provide sufficient room for non-flat components, such as capacitors, when the projector 100 is assembled. It can be appreciated that while the LED circuit 158 and circuit cutout 154 are generally rectangular in shape, other shapes may be used.

An LED cutout 156 is formed in the LED plate 150 in generally the same size and shape as the LED unit 160. LED unit 160 is disposed within the LED cutout 156 and oriented such that the LEDs 162 face downward through the LED cutout 156 toward the lens plate 170. The purpose of the LED cutout 156 is to secure the LED unit 160 and to enable to the LEDs 162 to be positioned close to the lenses 180, when the projector 100 is assembled. It can be appreciated that while the LED unit 160 and LED cutout 156 are generally circular in shape, other shapes may be used.

FIGS. 17-20 show an alternative embodiment of the invention, wherein LED plate 550 is used. LED plate 550 is comprised of a generally circular circuit board having a center hole 552 in the center of the LED plate 550. The center hole 552 has a diameter larger than the pin 234 of projector connector 230 but smaller than shoulder 232. LED plate 550 has a diameter less than the third diameter of the housing 110, and the bottom surface of LED plate 550 rests on the top surface of the third ledge 116.

LED plate 550 further comprises LED driver components 558 and a plurality of LEDs 560. Unlike the LED circuit 158 and LED unit 160 of LED plate 150, the components 558 and LEDs 560 of LED plate 550 are integrated directly onto the bottom surface of the LED plate 550.

The LEDs 560 are positioned between the center hole 552 and the outer edge of the LED plate 550 and spaced approximately equally with respect to axis X. Preferably, the number of LEDs 560 is the same as the number of lenses 180 in the lens plate 170, and each LED 560 is positioned such that it is vertically aligned with one lens 180 when the projector 100 is assembled. In the embodiment shown in FIGS. 17-20, LED plate 550 comprises three LEDs 560 each arranged approximately 120 degrees apart from adjacent LEDs. However, other embodiments may contain different numbers of LEDs 560 in different arrangements or patterns, which may or may not be in alignment with the lenses 180.

The LED driver components 558 are positioned so as not to interfere with the LEDs 560. In the embodiment shown in FIGS. 17-20, the LED driver components 558 are clustered together and positioned between two of the LEDs 560 in a radial direction and between the center hole 552 and an outer edge of the LED plate 550. However, any arrangement of LED driver components 558 can be used that enables LED plate 550 to fit within housing 110, that does interfere with LEDs 560, and that enables electrical communication between LED driver components 558, LEDs 560, power source 136, and switch 130 to power and control the LEDs 560 in accordance with this invention.

FIGS. 21-27 show a power plate 130 in accordance with a first embodiment of the invention. The power plate 130 has a diameter less than the second diameter of the housing 110. The bottom surface of the power plate 130 rests on the top surface of the second ledge 114. A center hole 132 is formed in the center of the power plate 130 and has a diameter larger than the pin 234 of projector connector 230 but smaller than shoulder 232.

Figure 25:
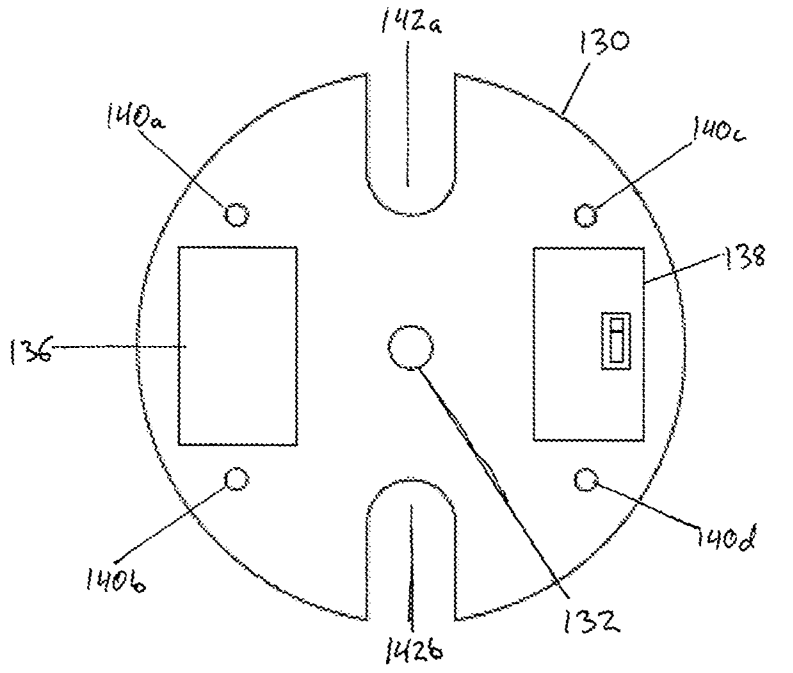
FIG. 25 is a top view of the power plate of FIG. 21, showing a power source and switch.
Figure 26:
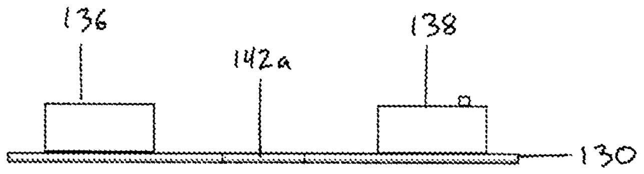
FIG. 26 is a side view of the power plate of FIG. 25.
Figure 27:
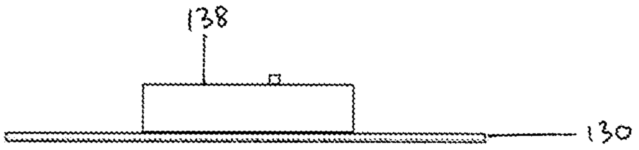
FIG. 27 is a front view of the power plate of FIG. 25.

As shown in FIGS. 25-27, the power plate 130 includes a power source 136 and a switch 138. The power source 136 and switch 138 are not shown in FIGS. 21-24 for clarity. The power source 136 and switch 138 electrically connected to the LED circuit 158 (electrical connections are not shown for clarity). In a preferred embodiment, the switch 138 is a manual slide type single pole single throw switch. However, the switch 138 may be any known type of switch, including but not limited to push button switches, toggle switches, and rotary switches.

Wire holes 142*a*, 142*b* are formed at the edges of the plate, providing a passage for wiring from the power source 136 and a switch 138 on the top surface of the power plate 130 to connect to the LED Circuit 158 of the LED plate 150. In the embodiment shown, wire holes 142*a*, 142*b* are positioned approximately opposite to each other. The wire holes 142*a*, 142*b* are generally U-shaped, each having a semicircular portion positioned approximately halfway between center hole 132 and an outside edge of the power plate 130, the edges of the semicircular portion transitioning to a straight portion extending transversely to axis X towards the outer edge of the power plate 130. However, it can be appreciated that wire holes 142*a*, 142*b* of different shapes, sizes, and orientations may be used to enable passage of wiring from the top side of the power plate 130 to the bottom side of power plate 130.

As shown in FIGS. 21-24, power plate 130 also includes first and second ventilation holes 134*a*, 134*b*. First ventilation hole 134*a* is positioned underneath the center of the power source 136. Second ventilation hole 134*b* is positioned underneath the center of the switch 138. In other embodiments, wire holes 142*a*, 142*b* may be removed. In these cases, the wiring may pass through the first and second ventilation holes 134*a*, 134*b* instead.

The power source 136 and switch 138 are secured to the power plate 130 any known means. Preferably, power source 136 and switch 138 are connected to the power plate 130 in such a way that they may be removed. In the embodiment shown in FIGS. 21-27, power plate 130 includes four anchor holes 140*a*, 140*b*, 140*c*, 140*d*. To secure the power source 136, attachment means such as string, wire, or zip ties are inserted through anchor holes 140*a* and 140*b* and wrapped around power source 136 to bind it to the top surface of the power plate 130. Similarly, to secure the switch 138, attachment means such as string, wire, or zip ties are inserted through anchor holes 140*c* and 140*d* and wrapped around switch 138 to bind it to the top surface of the power plate 130.

In a preferred embodiment, the power source 136 is a battery pack. However, in view of the low power requirements of operating LED lights, it is contemplated that other power sources may be used that would still enable the device 10 to be sufficiently portable. For example, the power source 136 could be a solar generator. In this case, a solar energy collector such as a solar panel would be disposed on the exterior of the device, preferably on top of the cover plate 120 or on an exterior side surface of the housing 110. Alternatively, the power source could be a mechanical generator, wherein the user applies mechanical force to generate electricity, such as by turning a hand crank.

Figure 28:
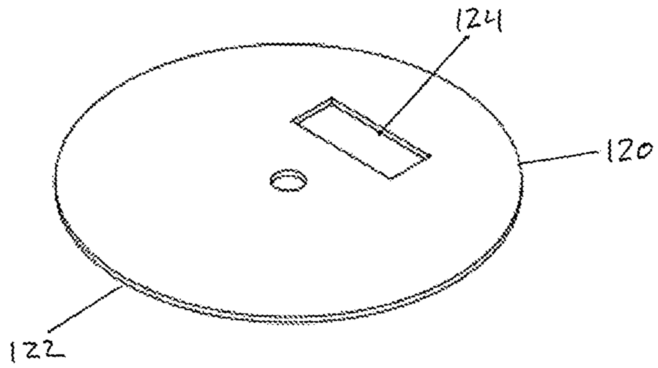
FIG. 28 is a perspective view of a cover plate in accordance with a first embodiment of the invention.
Figure 29:
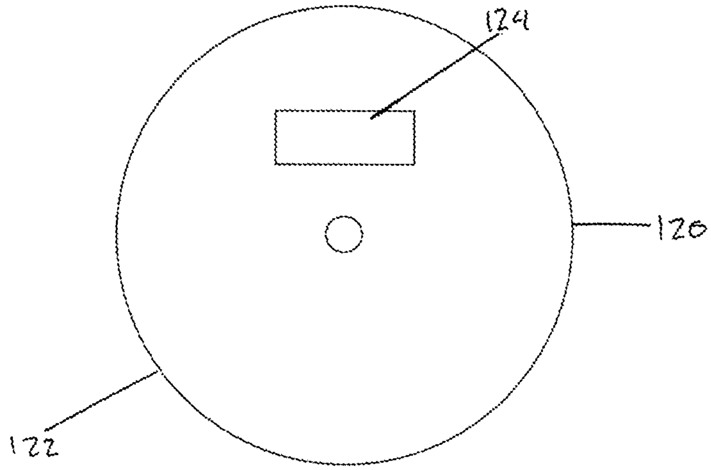
FIG. 29 is a top view of the cover plate of FIG. 28.
Figure 30:
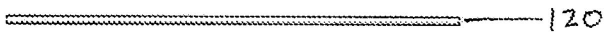
FIG. 30 is a side view of the cover plate of FIG. 28.
Figure 31:
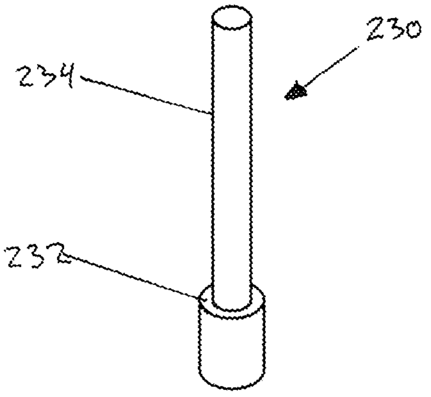
FIG. 31 is a perspective view of a projector connector in accordance with a first embodiment of the invention.
Figure 32:
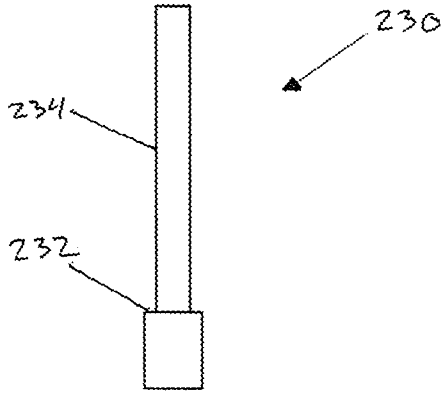
FIG. 32 is a side view of the projector connector of FIG. 31.
Figure 33:
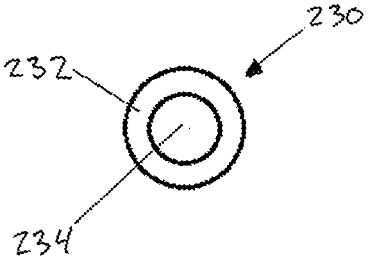
FIG. 33 is a top view of the projector connector of FIG. 31.
Figure 34:
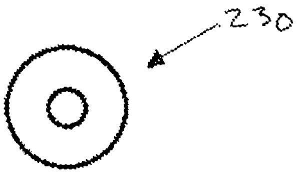
FIG. 34 is a bottom view of the projector connector of FIG. 31.
Figure 35:
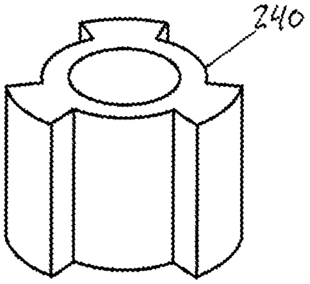
FIG. 35 is a perspective view of a locking nut in accordance with a first embodiment of the invention.
Figure 36:
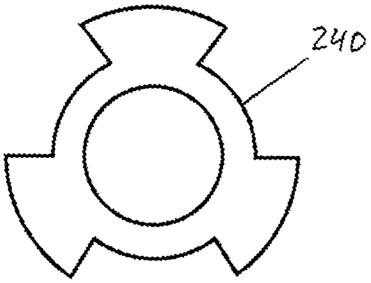
FIG. 36 is a top view of the locking nut of FIG. 35.
Figure 37:
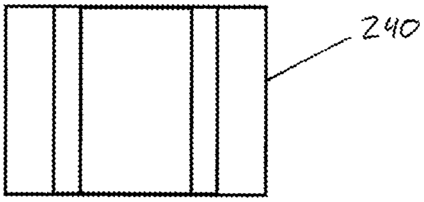
FIG. 37 is a side view of the locking nut of FIG. 35.

FIGS. 28-30 show a cover plate 120 in accordance with a first embodiment of the invention. The cover plate 120 has a diameter less than the second diameter of the housing 110. The bottom surface of the cover plate 120 rests on the top surface of the first ledge 112. A center hole 122 is formed in the center of the cover plate 120 and has a diameter larger than the pin 234 of projector connector 230 but smaller than shoulder 232. In a preferred embodiment, the cover includes a switch hole 124. The switch hole 124 is generally rectangular in shape and dimensioned large enough to allow operation of the switch 138 through the hole 124 from the top of the projector 100. However, it can be appreciated that if a different type of switch 138 is used, the switch hole 124 may be shaped, sized, and positioned differently to allow operation of the switch 138. For example, if a round push button is used, the switch hole 124 may be formed in a circular shape. Similarly, if no portion of the switch 138 extends far enough toward the top of the warning device 10 to extend through the switch hole 124, then the switch hole 124 should be dimensioned large enough to accommodate a user's finger to actuate the switch 138.

Figure 5:
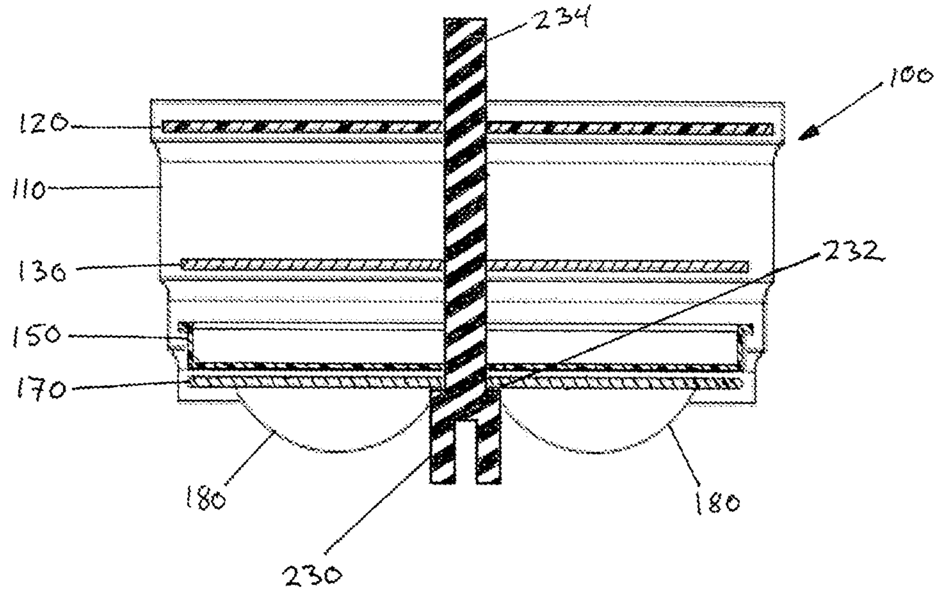
FIG. 5 is a cross-sectional view of the projector of FIG. 4 along line A-A.

When the switch 138 is actuated, the LED circuit 158 causes the LED unit 160 to be powered, which in turn causes LEDs 162 to light up. In the first embodiment of the invention, the LEDs 162 are disposed to one side of the LED plate 150. However, as shown in FIG. 5, a small gap exists between the LED plate 150 and the lens plate 170 such that a substantial amount of light output by the LEDs 162 still shines upon each of the lenses 180. The lenses 180 focus the light into a circle 40 on surface 20, as shown in FIG. 1.

The circle of light 40 illuminates and outlines the hazard 30. This is beneficial in that it increases the visibility of the hazard 30 itself, and it also indicates an area of caution on surface 20 which should be avoided. This eliminates the need for additional barriers such as ropes or tape to cordon off a dangerous area. The circle of light 40 also serves to illuminate the sign, providing greater visibility, particularly in low-light conditions.

In another embodiment of the invention, LED circuit 158 may include a timer to automatically shut off the projector 100 after a set duration of time. Preferably, the timer would be set for an amount of time that hazards usually take to be removed. For example, if the hazard is due to a wet floor following routine cleaning, the timer can be set for the amount of time the floor usually takes to completely dry following cleaning. This way, the device 10 would cease to illuminate the floor when the hazard no longer exists, signaling to employees and patrons that the area is safe to enter. In other embodiments, the timer may be set by a user of the device by entering a specific duration or selecting from a set of pre-determined durations.

In addition or alternatively, a timer could be used to cause the lights to periodically blink or flash. In a mode where the user prefers for the projector 100 to project light the entire time it is active, the timer causes the lights to momentarily shut off or "blink" for a short period of time to draw attention to the device. This mode may be useful where the projector must remain on for an extended period of time and people may become accustomed to the device 10 and forget about the hazard 30. In a mode where the user prefers for the projector 100 to be active but to not illuminate constantly (such as in conditions where ambient light is very bright or where a proximity or motion detector is used, as described below), a timer may be used to cause the light to momentarily turn on or "flash" for a short period of time. This mode may be advantageous when the device must remain active but the light is not in use because it signals to users that the device is still active.

In another embodiment of the invention, the projector 100 may include a motion or proximity sensor in electrical communication with the LED circuit 158. When the motion or proximity detector detects a person near the device 10, the projector 100 is activated and causes the LEDs 162 to turn on. When the motion or proximity sensor does not detect a person near the device, or when a predetermined time has passed, the projector 100 is deactivated. The sensors are beneficial in that the device is only active while needed, preserving battery life.

Figure 38:
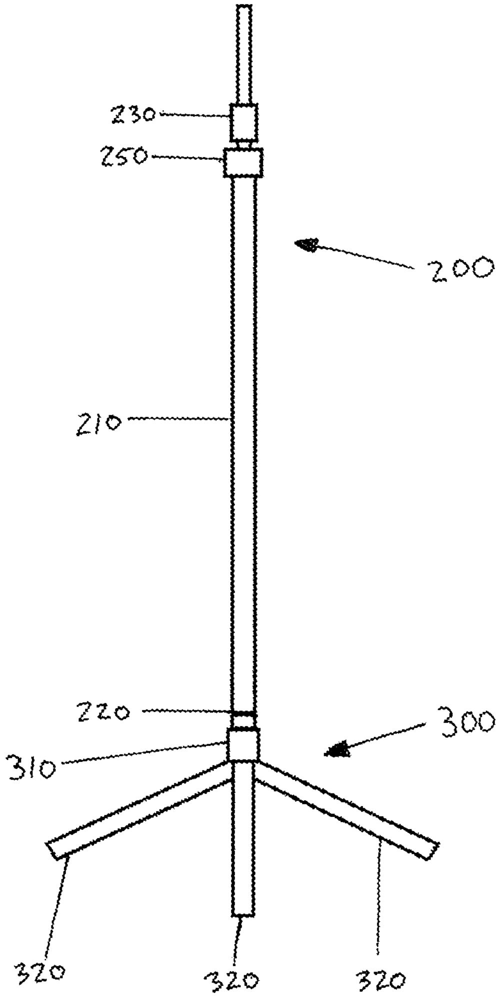
FIG. 38 is a side view of a stand and base in accordance with a first embodiment of the invention.
Figure 39:
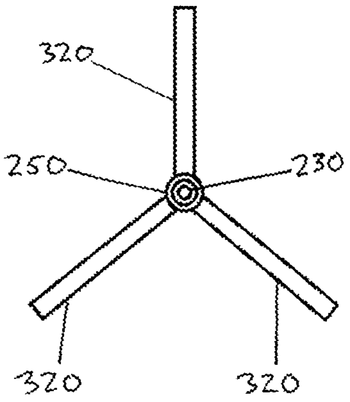
FIG. 39 is a top view of the stand and base of FIG. 38.

FIGS. 38-39 show the stand 200 and base 300 assembled together. As shown in FIG. 1, the stand 200 supports the projector 100 above the surface 20. The stand 200 comprises a pole 210, a base connector 220 removably attached to the bottom of the pole 210, a projector connector 230 removably attached to the top of the pole 210, and a locking nut 240 capable of attaching to the top of the projector connector 230. Although not shown in the figures, a top portion of the projector connector 230 and a bottom portion of the locking nut 240 are provided with threading to enable them to mate together.

In the embodiment shown in FIG. 38, the stand 200 is provided with telescoping mechanism 250 to increase or decrease the length of the stand 200. In the embodiment shown in FIG. 38, the telescoping mechanism 250 is a simple threaded connection that can be rotated to increase or decrease the distance between the top of pole 210 and the bottom of projector connector 230. However, the telescoping mechanism 250 may be any known means for telescoping a pole or tube.

In an alternative embodiment not shown, telescoping mechanism 250 may comprise a tube slidably disposed within pole 210 and a means for reversibly locking movement of the tube relative to the pole 210. The locking means may be any suitable type, such as clamp, a twist lock, or a spring-loaded pin lock.

The base 300 supports the stand 200 in an upright position. The base 300 comprises a stand connector 310 and a plurality of legs 320. The stand connector 310 is capable of reversibly connecting to the base connector 220. The stand connector 310 also serves as a hub and attachment point for one end of the plurality of legs 320. The other end of the legs 320 remains free. In the embodiment shown in FIGS. 38-39, the base 300 is provided with three legs 320. Legs are advantageous over other means for supporting the warning device 10, such as a flat base, because legs provide minimal points of contact with the surface 20 and is therefore a smaller area of the device 10 will come into contact with the hazard 30. It is also believed that three legs provide the most stability to the warning device 10 in the smallest footprint without the need for additional components such as weights. However, other numbers of legs are within the scope of the invention.

In at least one embodiment, the legs 320 are capable of folding and unfolding. In the unfolded or "open" position, the free ends of the legs define a first width which is at least wide enough to provide enough stability to the base to prevent it from easily tipping over. In the folded or "closed" position, the legs may be folded up toward the stand or downward away from the stand, such that the free ends of the legs define a second width smaller than the first width. Preferably, the legs 320 fold to a second width that is less than or equal to the outer diameter of the housing 110.

Preferably, the stand 200 and base 300 are constructed from aluminum due to its high strength and low density. However, other lightweight materials may be used such as plastic or fiberglass. In environments where device 10 is at high risk of being knocked over by people or equipment or blown over by wind, stand 200 and/or base 300 may be constructed of a heavier and more durable material, such as steel.

Figure 40:
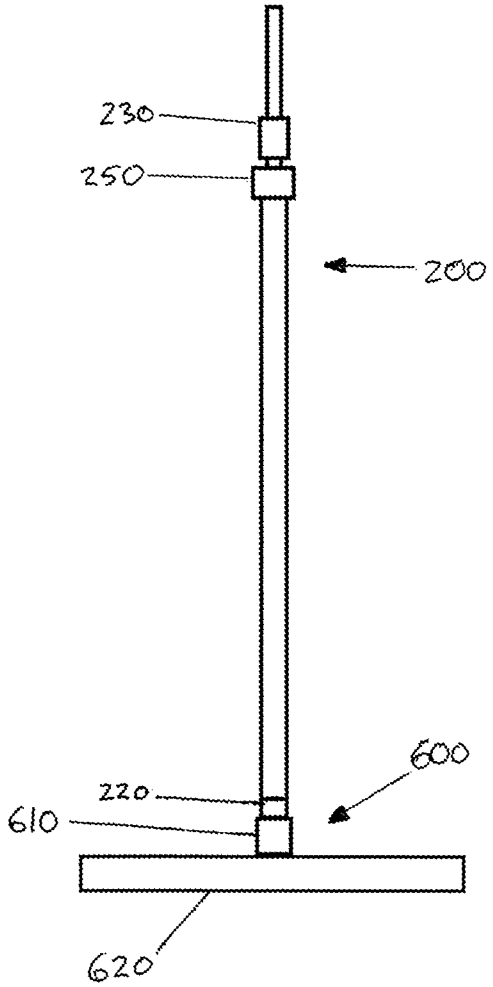
FIG. 40 is a side view of a stand and base in accordance with a third embodiment of the invention.
Figure 41:
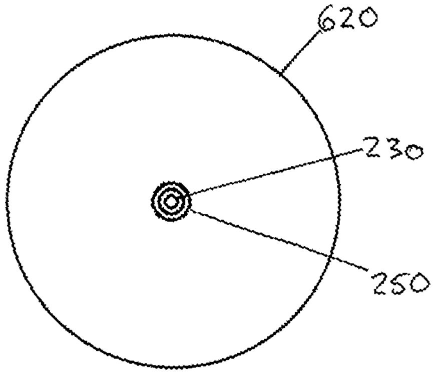
FIG. 41 is a top view of the stand and base of FIG. 40.

In at least one alternative embodiment, a base 600 does not include any legs but instead includes a base plate 620 and a stand connector 610. The stand connector 610 is similar to stand connector 310 in that it is capable of reversibly connecting to the base connector 220. Base plate 620 rests directly on top of surface 20 when the device is in use. In the embodiment shown in FIGS. 40-41, base plate 620 is circular. However, other shapes may be used, such as squares, triangles, and hexagons. Base plate 620 is preferably made of a dense material, such as steel, to provide a lower center of gravity to improve the stability of warning device 10. Alternatively, base plate 620 may be constructed of less dense materials if additional weight is added to the base 600.

In yet another embodiment, base 600 may be provided with a plurality of wheels attached to a bottom surface of the base plate 620. Preferably, such wheels would be in the form of swiveling caster wheels, although other types of wheels may be sued. The wheels would enable base 600 to be moved without lifting the device 10 off of the floor. This may be advantageous where the device 10 is constructed of heavier materials to improve portability.

The sign 400 primarily serves two functions: to increase the visibility of the warning device 10 and to provide information about the nature of the hazard to the user and others in proximity of the hazard (such as fellow employees or customers). In a preferred embodiment, the sign comprises at least one sides, an opening at the bottom, and an opening at the top to enable the sign to be slipped onto the stand. In this embodiment, the top and bottom openings are at least large enough to allow the pole 210 to be inserted though the sign 400, while the bottom opening is small enough to rest on top of the legs 340 without touching the floor.

As shown in FIG. 1, the sign is foldable pyramidal "WET FLOOR" sign comprising four sides 410. However, signs with different numbers of sides are contemplated, including but not limited to three-sided pyramidal "pop-up" signs, two-sided folding signs, and cones. In further additional embodiments, digital signs are contemplated. Such signs may be flat LED or LCD signs, curved LCD signs, or other types of commercially available digital signs.

FIG. 1 illustrates the device with all components fully assembled. The device 10 may be assembled and used according to the following steps. First if the legs 320 are in a folded position, they are first unfolded. Next, the base 300 is placed in or near the center of the hazard depending on its size. If the hazard is small, the device 10 may be placed to the side of the hazard to avoid contamination while still illuminating it within the circle of projected light 40 Next, the stand 200 is connected to the base 300 via the base connector 220. Next, the projector 100 is then mounted on the stand 200 according to the following steps: (1) if the projector 100 has not been assembled yet, the plates 170, 150, 130, and 120 are placed within the housing 110 in the order shown in FIG. 5; (2) the projector connector 230 is inserted into each of the plates 170, 150, 130, and 120 from the bottom, starting by inserting the projector connector 230 into center hole 152, then into center hole 132, then into center hole 122, then into center hole 112; and (3) the locking nut 240 is attached to the top-most portion of projector connector 230 to lock the projector 100 onto the stand. Once device 10 has been assembled, the telescoping mechanism 250 is actuated to raise or lower the projector 100 to adjust the size of the projected light circle 40.

In at least one embodiment, the projector 100 may be provided with a focusing means. The focusing means comprises a means for raising and lowering the LED plate 150 relative to the lens plate 170 within the housing 110. Preferably, this means comprises a screw or threaded connection mechanically linked to a dial disposed in the side of the housing 110, whereby a user may turn the dial to raise or lower the LED plate 150 within portion 110*c*. However, other suitable means for raising and lowering the LED plate 150 are within the scope of the invention, such as a lever, a slide, or a linear motor. By increasing or decreasing the distance between the LEDs 162 and the lenses 180, the distance at which the circle of light 40 is focused changes. The focusing means may be used together with the telescoping mechanism 250 to both change the size of the circle of light 40 and focus it.

In the event that a hazard 30 is too large to illuminate with a single device 10, a plurality of devices 10 may be used. In this scenario, each of the plurality of devices 10 should be arranged near the edge of the hazard 30 and spaced approximately equally apart. The circles of light 40 projected by each device 10 may be sized and focused according to the methods described above, and may either overlap or be separate.

The device 10 may be disassembled for more compact storage and transport by the following steps: (1) remove the locking nut 240 from the top of the projector connector 230; (2) remove the projector 100 from the projector connector 230; (3) remove the sign 400 from the stand 200; and (4) fold up the legs 320 of the base 300.

In another embodiment of the invention, the base 300 may be provided with a drying device to accelerate the removal of the hazard 30. The drying device may be a heater or fan to increase the rate of evaporation. The drying device may be controlled by a timer, or may be manually operated.

In another embodiment of the invention, the device 10 may also be provided with a moisture sensor. Preferably, the sensor is located on base 300 near surface 20. Such sensor is in electronic communication with the LED circuit 158 and is configured to shut off the projector 100 when the moisture level is below a predetermined threshold. In embodiments comprising a drying device, such sensor may also be used to shut off the drying device once the moisture level drops below the predetermined threshold.

In an alternative embodiment of the projector 100, the housing 110 may be generally frustoconical in shape without the first, second, third, and fourth portions 110*a-d* and without ledges 112, 114, 116, 118. In this embodiment the walls of the housing slope at a first angle, and each of the plates 120, 130, 150, 170 are provided with a corresponding angle on their outer edges. Each plate 120, 130, 150, 170 is dimensioned such that the exterior edges of each plate mates with the interior sloped wall of the housing 110 at approximately the same relative positions as shown in FIG. 5.

In another alternative embodiment of the projector 100, an interior surface of the housing 110 and the exterior edges of the plates 120, 130, 150, 170 may be provided with threading. Each plate is configured to mate with the housing at a predetermined depth at approximately the same relative positions as shown in FIG. 5.

In another alternative embodiment, the device 10 may be equipped with an audio device such as a speaker. The speaker would provide an auditory warning signal to draw additional attention to the device. The auditory signal would also enable people who are blind or have poor vision to be aware of the hazard. The auditory signal may be a recorded voice message or any type of noise likely to draw attention, such as a chirp, a bell, or a siren.

In another embodiment, the projector 100 may be provided with a transparent film disposed between the LED plate 150 and the lens plate 170. The film contains a message in the form of text, symbols, or images. As the light from LEDs 160 shine through the film and onto the lenses 180, the message is projected onto the surface 20 within light circle 40. The message may convey information about the nature of the hazard itself such as "WET FLOOR" or an image of a person slipping and falling, or it may just be a message drawing attention to the hazard such as "CAUTION" or an "X". Preferably, the film is provided on an insert which may be removably inserted into the housing 110 from the side. This is beneficial in that a user may easily remove an insert containing one message and replace it with an insert containing a different message. Alternatively, the film may be disposed on an additional plate within the housing 110, whereby it would be replace or removed by disassembling the projector 100.

In another embodiment, the LED unit 160 may be replaced with a video projector. The video projector operates similarly to the LEDs 162 except that instead of producing a steady light signal, the video projector products a light signal consisting of a video clip or animation. Such light signal is focused and sized in the same manner as light from the LEDs 162. The result is that the circle of light 40 would display the video clip or animation stored in the video projector. Such light signal could provide information regarding the nature of the hazard 30, a generalized warning, or animated directions such as moving arrows to show people where to go to avoid the hazard. Alternatively, the light signal could be an animation or video clip for entertainment purposes to prevent boredom and fatigue of viewing a static circle of light 40.

Figure 42:
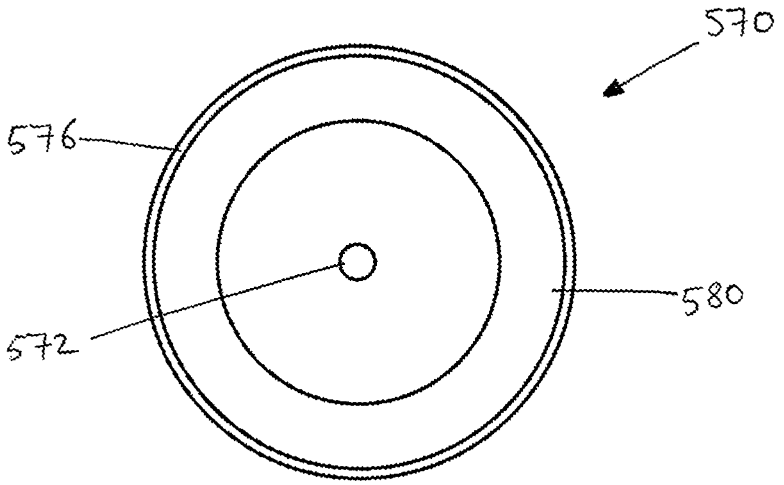
FIG. 42 is a bottom view of a lens plate in accordance with a fourth embodiment of the invention.
Figure 43:
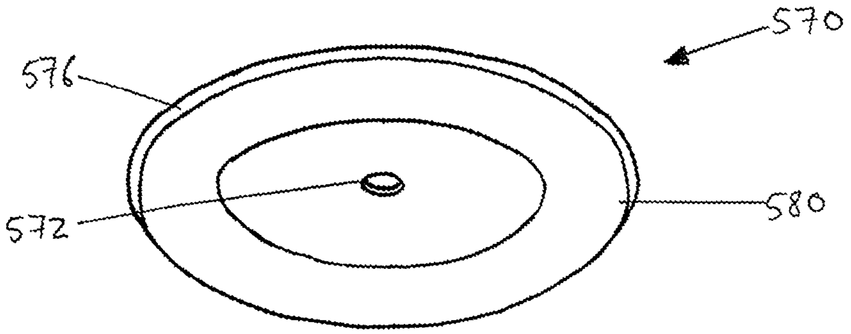
FIG. 43 is a perspective view of the lens plate of FIG. 42
Figure 44:
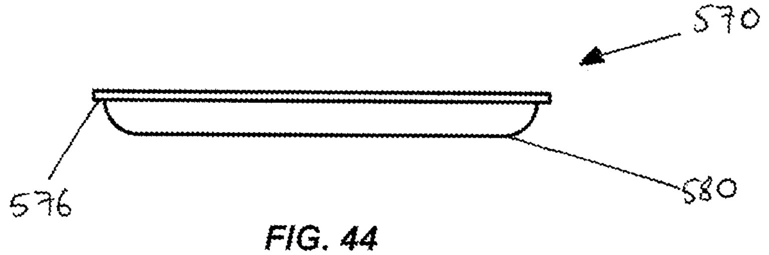
FIG. 44 is a side view of the lens plate of FIG. 42.
Figure 45:
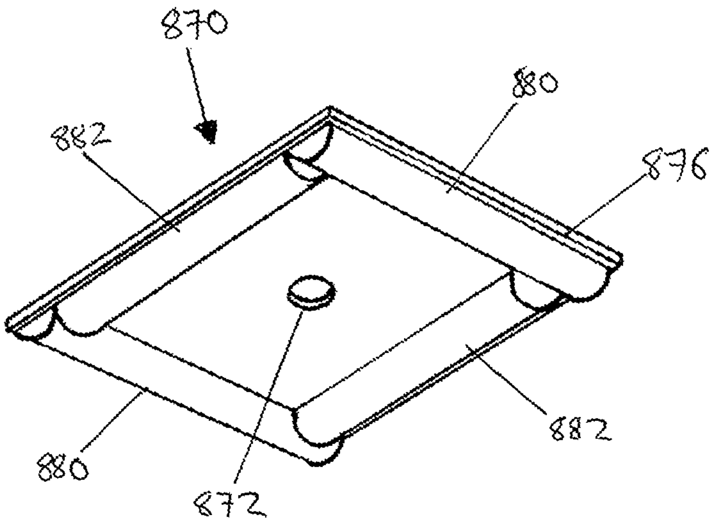
FIG. 45 is a perspective view of a lens plate in accordance with a fifth embodiment of the invention.
Figure 46:
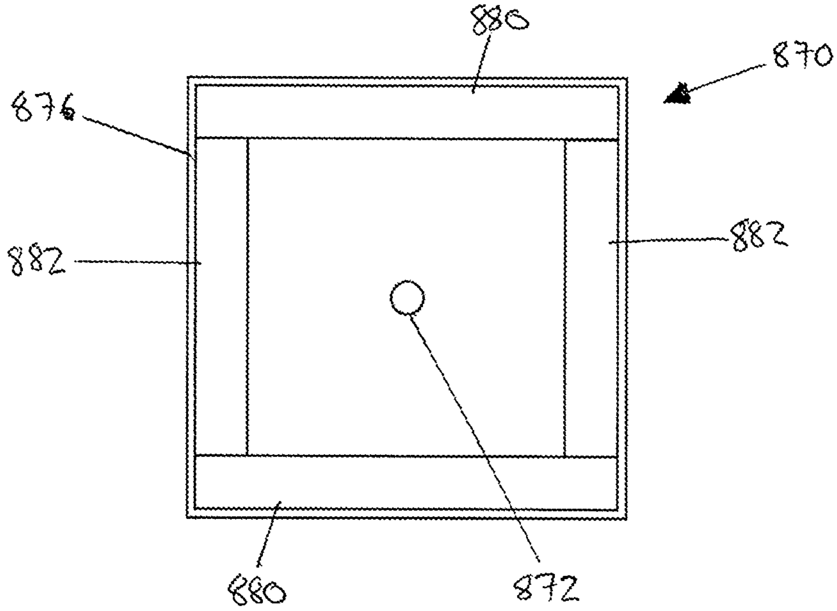
FIG. 46 is a bottom view of the lens plate of FIG. 45.
Figure 47:
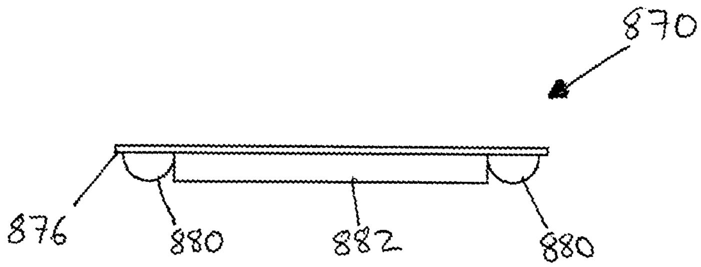
FIG. 47 is a side view of the lens plate of FIG. 45.
Figure 48:
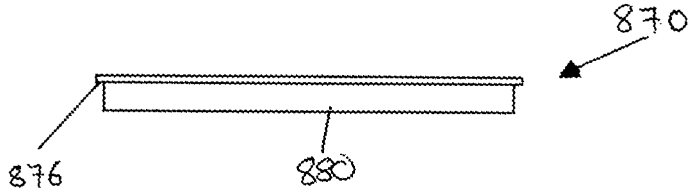
FIG. 48 is a front view of the lens plate of FIG. 45.

In another embodiment shown in FIGS. 42-44, the projector 100 includes a lens plate 570 having a single toroidal lens 580. The lens plate 570 is disc shaped and includes a center hole 572 similarly to lens plate 170. However, unlike the generally hemispherical lenses 180, the lens 580 is shaped as a half-torus (i.e., having a generally annular shape when viewed from below and having a semicircular shape when viewed in cross section) and has an outer diameter that is only slightly less than the outer diameter of the lens plate 570, forming a rim 576. When the lens plate 570 is assembled into the projector 100, the rim 576 rests on the top surface of the fourth ledge 118, and the projector connector 220 is inserted into center hole 572.

In an alternate embodiment, the projector may be generally box-shaped, being a cuboid or rectangular prism. In this configuration, the housing and plates are generally similar to housing 110 and plates 120, 130, 150 are configured generally the same as in the first embodiment, except that all of those parts are square when viewed from the top or bottom, rather than circular. In this embodiment, an alternative lens plate as shown in FIGS. 45-48 is used. Lens plate 870 is square and includes a center hole 872. Lens plate 870 also includes a pair of long lenses 880 and a pair of short lenses 882 that are all generally half-cylinder shaped (i.e., having a generally rectangular shape when viewed from the top or side and a generally semicircular shape when viewed on either end). The long lenses 880 are parallel and disposed on opposite sides of the lens plate 870. The short lenses 882 are perpendicular to long lenses 880 and are disposed on the remaining two sides of the lens plate 870. Each end of each short lens 882 abuts a side of each long lens 880 that is closest to center hole 872. Meanwhile, each end of each long lens 880 extends as far as a side of each short lens 882 that is furthest from center hole 872. A rim 876 is formed around all of the exterior edges of the four lenses 880, 882. Center hole 872 functions similarly to center hole 172, in that the projector connector 220 is inserted into center hole 872 when the alternative square shaped projector is mounted on the base 200.

Figure 49:
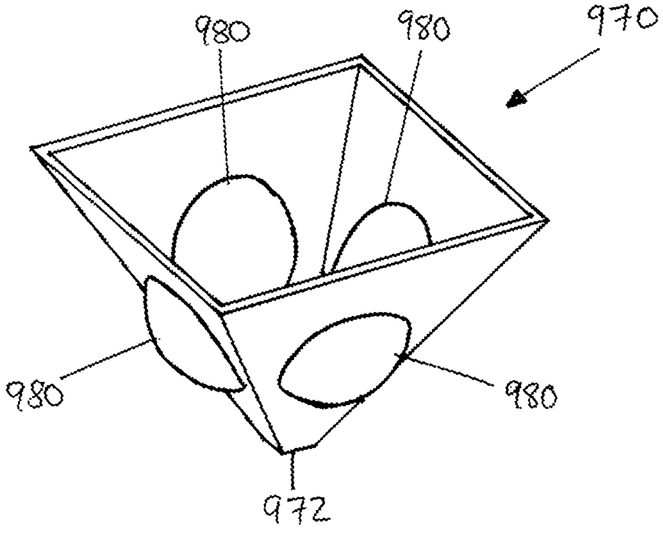
FIG. 49 is a perspective view of a lens plate in accordance with a sixth embodiment of the invention.
Figure 50:
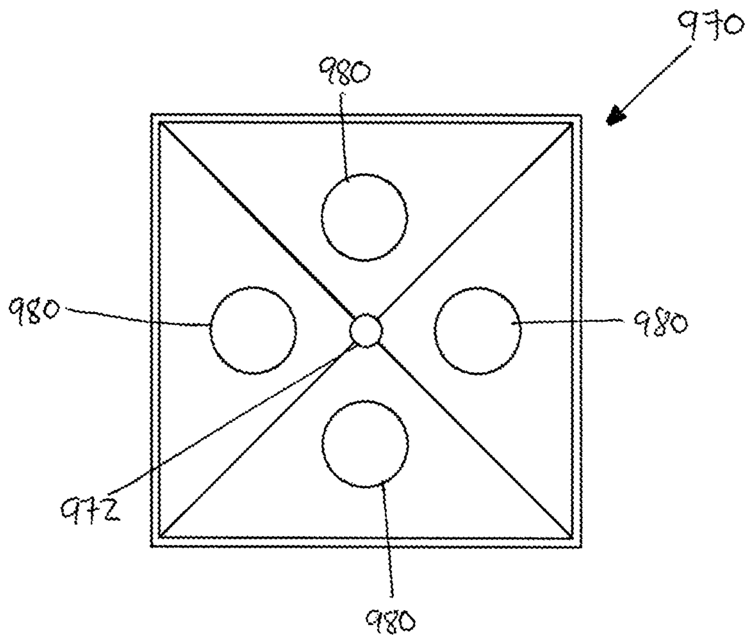
FIG. 50 is a top view of the lens plate of FIG. 49.
Figure 51:
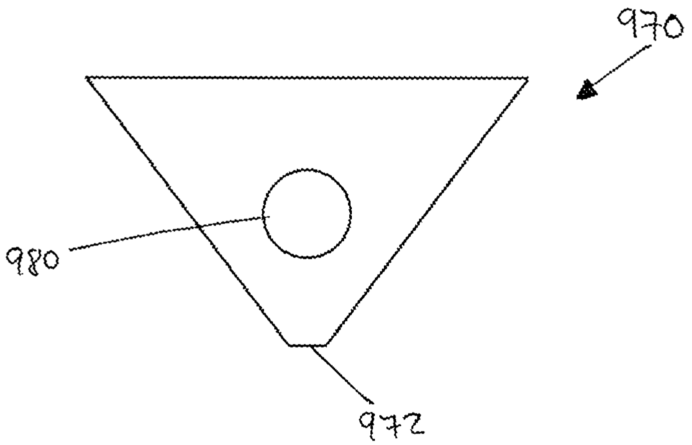
FIG. 51 is a side view of the lens plate of FIG. 49.

In another embodiment wherein the box-shaped projector is used, an alternative lens plate 970 may also be used. With reference to FIGS. 49-51, lens plate 970 is generally square pyramidal in shape, having an open end near the top forming a square shape and being slightly truncated near the bottom, forming a center hole 972. Each of the four side faces of the lens plate 970 includes a lens 980. Each of the four lenses 980 is generally hemispherical in shape, similar to lenses 180. Center hole 972 functions similarly to center hole 172, in that the projector connector 220 is inserted into center hole 972 when the alternative square shaped projector is mounted on the base 200.

Although the present invention has been described in relation to particular embodiments thereof, it can be appreciated that other variations and modifications will be apparent to those skilled in the art without departing from the teaching of the invention. Therefore, the present invention is not limited by the specific disclosure herein by only by the claims.

I claim:

1. A hazard warning device, comprising a base, a stand having a first end connected to the base and a second end extending away from the base, a projector connected to a second end of the stand, and a sign disposed between the base and projector, wherein the projector is capable of projecting light onto a surface under the projector to illuminate an area of the surface containing a hazard, wherein the projector is configured to project at least one circle of light onto the surface, wherein the circle completely encompasses the hazard, and wherein the projector further comprises a means for focusing the circle of light.

2. The hazard warning device according to claim 1, wherein the device further comprises means for increasing and decreasing the radius of the circle of light.

3. The hazard warning device according to claim 1, wherein the stand comprises a telescoping means for increasing and decreasing the height of the projector relative to the surface.

4. The hazard warning device according to claim 1, wherein the base comprises at least three legs, and the legs are capable of moving between an open position having a first width and a closed position having a second width smaller than the first width.

5. The hazard warning device according to claim 1, wherein the device further comprises a timer, such timer configured to deactivate the projector after a predetermined time.

6. The hazard warning device according to claim 1, wherein the device further comprises a moisture sensor electrically connected to the projector, such that when the sensor detects a level of moisture below a predetermined threshold, the projector is deactivated.

7. The hazard warning device according to claim 1, wherein the base further comprises a heater or fan.

8. The hazard warning device of claim 1, further comprising an audio device capable of generating an auditory signal.

9. The hazard warning device according to claim 1, wherein the device further comprises a motion sensor electrically connected to the projector, such that when the sensor detects motion within a predetermined range of the motion sensor, the projector is activated for a predetermined period of time, after which the projector is deactivated.

10. The hazard warning device according to claim 1, wherein the device further comprises a proximity sensor electrically connected to the projector, such that when the sensor detects an object within a predetermined range of the proximity sensor, the projector is activated.

11. The hazard warning device according to claim 1, wherein the projector is substantially cylindrical, and further comprises a half-toroidal lens.

12. The hazard warning device according to claim 1, wherein the projector is substantially cuboid.

13. A system comprising a plurality of hazard warning devices according to claim 1, wherein each hazard warning device is configured to project at least one circle of light onto the surface, wherein each individual circle of light encompasses a portion of the hazard and overlaps at least partially with at least one other circle of light, and wherein the hazard is completely encompassed by the totality of circles of light projected by the plurality of devices.

14. A hazard warning device, comprising a base, a stand having a first end connected to the base and a second end extending away from the base, a projector connected to a second end of the stand, and a sign disposed between the base and projector, wherein the projector is capable of projecting light onto a surface under the projector to illuminate an area of the surface containing a hazard, wherein the projector comprises a light source and at least one lens disposed below the light source.

15. The hazard warning device according to claim 14, wherein the projector further comprises a means for increasing and decreasing the distance between the light source and the at least one lens.

16. The hazard warning device according to claim 14, wherein the projector further comprises a film between the light source and the at least one lens, wherein the film is transparent and contains one or more of text, symbols, and images.

17. The hazard warning device of claim 14, wherein the projector is a video projector.

18. A system comprising a plurality of hazard warning devices according to claim 14, wherein each hazard warning device is configured to project at least one circle of light onto the surface, wherein each individual circle of light encompasses a portion of the hazard and overlaps at least partially with at least one other circle of light, and wherein the hazard is completely encompassed by the totality of circles of light projected by the plurality of devices.

* * * * *